United States Patent
Adjaoute (10) Patent No.: US 11,348,110 B2
(45) Date of Patent: May 31, 2022

(54) ARTIFICIAL INTELLIGENCE FRAUD MANAGEMENT SOLUTION

(71) Applicant: Brighterion, Inc., Purchase, NY (US)

(72) Inventor: Akli Adjaoute, Mill Valley, CA (US)

(73) Assignee: Brighterion, Inc., Purchase, NY (US)

( * ) Notice: Subject to any disclaimer, the term of this patent is extended or adjusted under 35 U.S.C. 154(b) by 54 days.

(21) Appl. No.: 16/168,566

(22) Filed: Oct. 23, 2018

(65) Prior Publication Data
US 2019/0066112 A1    Feb. 28, 2019

Related U.S. Application Data

(63) Continuation of application No. 14/514,381, filed on Oct. 15, 2014, now abandoned, which is a continuation-in-part of application No. 14/454,749, filed on Aug. 8, 2014, now Pat. No. 9,779,407.

(51) Int. Cl.
| | |
|---|---|
| *G06Q 40/00* | (2012.01) |
| *G06Q 20/40* | (2012.01) |
| *G06Q 10/06* | (2012.01) |
| *G06Q 40/02* | (2012.01) |

(52) U.S. Cl.
CPC ..... *G06Q 20/4016* (2013.01); *G06Q 10/0635* (2013.01); *G06Q 40/025* (2013.01)

(58) Field of Classification Search
CPC ..................................................... G06Q 40/00
USPC ........................................................ 705/35
See application file for complete search history.

(56) References Cited

U.S. PATENT DOCUMENTS

| | | | |
|---|---|---|---|
| 5,377,354 | A | 12/1994 | Scannell et al. |
| 5,692,107 | A | 11/1997 | Simoudis et al. |
| 5,819,226 | A | 10/1998 | Gopinathan et al. |
| 5,822,741 | A | 10/1998 | Fischthal |
| 6,009,199 | A | 12/1999 | Ho |

(Continued)

FOREIGN PATENT DOCUMENTS

| | | |
|---|---|---|
| DE | 4230419 | 3/1994 |
| EP | 0647903 | 4/1995 |

(Continued)

OTHER PUBLICATIONS

Office Action From U.S. Appl. No. 14/454,749 (dated Feb. 3, 2017).

(Continued)

*Primary Examiner* — Ojo O Oyebisi
(74) *Attorney, Agent, or Firm* — Hovey Williams LLP (57) ABSTRACT

An artificial intelligence fraud management solution comprises an expert programmer development system to build trainable general payment fraud models that integrate several artificial intelligence classifiers like neural networks, case based reasoning, decision trees, genetic algorithms, fuzzy logic, and rules and constraints. These are further integrated by the expert programmers and development system with smart agents and associated real-time profiling, recursive profiles, and long-term profiles. The trainable general payment fraud models are trained with supervised and unsupervised data to produce an applied payment fraud model. This then is applied by a commercial client to process real-time transactions and authorization requests for fraud scores.

18 Claims, 8 Drawing Sheets

(56) References Cited

U.S. PATENT DOCUMENTS

| | | | |
|---|---|---|---|
| 6,026,397 A | 2/2000 | Sheppard | |
| 6,029,154 A | 2/2000 | Pettitt | |
| 6,122,624 A | 9/2000 | Tetro et al. | |
| 6,161,130 A | 12/2000 | Horvitz et al. | |
| 6,254,000 B1 | 7/2001 | Degen et al. | |
| 6,272,479 B1 | 8/2001 | Farry et al. | |
| 6,330,546 B1 * | 12/2001 | Gopinathan | G06Q 20/00 705/35 |
| 6,347,374 B1 | 2/2002 | Drake et al. | |
| 6,424,997 B1 | 7/2002 | Buskirk, Jr. et al. | |
| 6,453,246 B1 | 9/2002 | Agrafiotis et al. | |
| 6,535,728 B1 | 3/2003 | Perfit et al. | |
| 6,601,048 B1 | 7/2003 | Gavan et al. | |
| 6,647,379 B2 | 11/2003 | Howard et al. | |
| 6,711,615 B2 | 3/2004 | Porras et al. | |
| 6,782,375 B2 | 8/2004 | Abdel-Moneim et al. | |
| 6,889,207 B2 | 5/2005 | Slemmer et al. | |
| 7,007,067 B1 | 2/2006 | Azvine et al. | |
| 7,036,146 B1 | 4/2006 | Goldsmith | |
| 7,089,592 B2 | 8/2006 | Adjaoute | |
| 7,159,208 B2 | 1/2007 | Keeley | |
| 7,165,037 B2 | 1/2007 | Lazarus et al. | |
| 7,251,624 B1 | 7/2007 | Lee et al. | |
| 7,403,922 B1 | 7/2008 | Lewis et al. | |
| 7,406,502 B1 | 7/2008 | Oliver et al. | |
| 7,433,960 B1 | 10/2008 | Dube et al. | |
| 7,457,401 B2 | 11/2008 | Lawyer et al. | |
| 7,464,264 B2 | 12/2008 | Goodman et al. | |
| 7,483,947 B2 | 1/2009 | Starbuck et al. | |
| 7,562,122 B2 | 7/2009 | Oliver et al. | |
| 7,590,970 B2 | 9/2009 | Bromley | |
| 7,630,956 B2 | 12/2009 | Wyatt et al. | |
| 7,631,362 B2 | 12/2009 | Ramsey | |
| 7,668,769 B2 | 2/2010 | Baker et al. | |
| 7,685,083 B2 | 3/2010 | Fairweather | |
| 7,813,937 B1 | 10/2010 | Pathria et al. | |
| 7,835,919 B1 | 11/2010 | Bradley et al. | |
| 7,853,469 B2 | 12/2010 | Maitland et al. | |
| 7,877,421 B2 | 1/2011 | Berger et al. | |
| 8,015,108 B2 | 9/2011 | Haggerty et al. | |
| 8,027,439 B2 | 9/2011 | Zoldi et al. | |
| 8,036,981 B2 | 10/2011 | Shirey et al. | |
| 8,041,597 B2 | 10/2011 | Li et al. | |
| 8,090,648 B2 | 1/2012 | Zoldi et al. | |
| 8,401,990 B2 | 3/2013 | Silsby | |
| 8,458,069 B2 | 6/2013 | Adjaoute | |
| 8,484,301 B2 | 7/2013 | Wilson et al. | |
| 8,548,137 B2 | 10/2013 | Zoldi et al. | |
| 8,555,077 B2 | 10/2013 | Davis et al. | |
| 8,561,007 B2 | 10/2013 | Challenger et al. | |
| 8,572,736 B2 | 10/2013 | Lin | |
| 8,744,979 B2 | 6/2014 | Sundelin et al. | |
| 8,805,737 B1 | 8/2014 | Chen et al. | |
| 9,069,737 B1 | 6/2015 | Kimotho et al. | |
| 9,264,442 B2 | 2/2016 | Bart et al. | |
| 9,400,879 B2 | 7/2016 | Tredoux et al. | |
| 9,721,296 B1 | 8/2017 | Chrapko | |
| 9,898,741 B2 | 2/2018 | Siegel et al. | |
| 10,339,606 B2 | 7/2019 | Gupta et al. | |
| 10,817,530 B2 | 10/2020 | Siebel et al. | |
| 2002/0147754 A1 | 10/2002 | Dempsey et al. | |
| 2002/0188533 A1 | 12/2002 | Sanchez et al. | |
| 2002/0194119 A1 | 12/2002 | Wright et al. | |
| 2003/0009495 A1 | 1/2003 | Adjaoute | |
| 2003/0084449 A1 | 5/2003 | Chane et al. | |
| 2003/0158751 A1 | 8/2003 | Suresh et al. | |
| 2004/0073634 A1 | 4/2004 | Haghpassand | |
| 2004/0111363 A1 | 6/2004 | Trench et al. | |
| 2004/0153555 A1 | 8/2004 | Haverinen et al. | |
| 2004/0225473 A1 | 11/2004 | Aoki et al. | |
| 2006/0041464 A1 | 2/2006 | Powers et al. | |
| 2006/0149674 A1 | 7/2006 | Cook et al. | |
| 2006/0171509 A1 | 8/2006 | Berthaud et al. | |
| 2006/0212350 A1 | 9/2006 | Ellis et al. | |
| 2007/0067853 A1 | 3/2007 | Ramsey | |
| 2007/0112667 A1 | 5/2007 | Rucker | |
| 2007/0124246 A1 | 5/2007 | Lawyer et al. | |
| 2007/0174164 A1 | 7/2007 | Biffle et al. | |
| 2007/0174214 A1 | 7/2007 | Welsh et al. | |
| 2007/0239604 A1 | 10/2007 | O'Connell et al. | |
| 2007/0239936 A1 | 10/2007 | Gluhovsky | |
| 2008/0086365 A1 | 4/2008 | Zollino et al. | |
| 2008/0104101 A1 | 5/2008 | Kirshenbaum et al. | |
| 2008/0162259 A1 | 7/2008 | Patil et al. | |
| 2008/0281743 A1 | 11/2008 | Pettit | |
| 2009/0307028 A1 | 12/2009 | Eldon et al. | |
| 2010/0027527 A1 | 2/2010 | Higgins et al. | |
| 2010/0082751 A1 | 4/2010 | Meijer et al. | |
| 2010/0115610 A1 | 5/2010 | Tredoux et al. | |
| 2010/0125470 A1 | 5/2010 | Chisholm | |
| 2010/0191634 A1 | 7/2010 | Macy et al. | |
| 2010/0228656 A1 | 9/2010 | Wasserblat et al. | |
| 2010/0305993 A1 | 12/2010 | Fisher | |
| 2011/0016041 A1 | 1/2011 | Scragg | |
| 2011/0035440 A1 | 2/2011 | Henkin et al. | |
| 2011/0055196 A1 | 3/2011 | Sundelin et al. | |
| 2011/0055264 A1 | 3/2011 | Sundelin et al. | |
| 2011/0238566 A1 | 9/2011 | Santos | |
| 2011/0258049 A1 | 10/2011 | Ramer et al. | |
| 2011/0276468 A1 | 11/2011 | Lewis et al. | |
| 2011/0307382 A1 | 12/2011 | Siegel et al. | |
| 2012/0047072 A1 | 2/2012 | Larkin | |
| 2012/0137367 A1 | 5/2012 | Dupont et al. | |
| 2012/0203698 A1 | 8/2012 | Duncan et al. | |
| 2012/0226613 A1 | 9/2012 | Adjaoute | |
| 2013/0018796 A1 | 1/2013 | Kolhatkar et al. | |
| 2013/0204755 A1 | 8/2013 | Zoldi et al. | |
| 2013/0305357 A1 | 11/2013 | Ayyagari et al. | |
| 2014/0082434 A1 | 3/2014 | Knight et al. | |
| 2014/0149128 A1 | 5/2014 | Getchius | |
| 2014/0180974 A1 | 6/2014 | Kennel et al. | |
| 2014/0279803 A1 | 9/2014 | Burbank et al. | |
| 2015/0046224 A1 | 2/2015 | Adjaoute | |
| 2015/0161609 A1 | 6/2015 | Christner | |
| 2015/0193263 A1 | 7/2015 | Nayyar et al. | |
| 2015/0279155 A1 | 10/2015 | Chun et al. | |
| 2015/0348042 A1 | 12/2015 | Jivraj et al. | |
| 2016/0260102 A1 | 9/2016 | Nightengale et al. | |
| 2017/0006135 A1 | 1/2017 | Siebel et al. | |
| 2017/0006141 A1 | 1/2017 | Bhadra | |
| 2017/0083386 A1 | 3/2017 | Wing et al. | |
| 2017/0270534 A1 | 9/2017 | Zoldi et al. | |
| 2017/0289176 A1 | 10/2017 | Chen et al. | |
| 2017/0347283 A1 | 11/2017 | Kodaypak | |
| 2018/0032723 A1 | 2/2018 | Danger et al. | |
| 2018/0040064 A1 | 2/2018 | Grigg et al. | |
| 2018/0048710 A1 | 2/2018 | Altin | |
| 2018/0151045 A1 | 5/2018 | Kim et al. | |
| 2018/0182029 A1 | 6/2018 | Vishwa | |
| 2018/0208448 A1 | 7/2018 | Zimmerman et al. | |
| 2018/0253657 A1 | 9/2018 | Zhao et al. | |
| 2019/0007517 A1 | 1/2019 | Jagannath et al. | |
| 2019/0156417 A1 | 5/2019 | Zhao et al. | |
| 2019/0213498 A1 | 7/2019 | Adjaoute | |
| 2019/0236695 A1 | 8/2019 | McKenna et al. | |
| 2019/0250899 A1 | 8/2019 | Riedl et al. | |
| 2019/0265971 A1 | 8/2019 | Behzadi et al. | |
| 2019/0278777 A1 | 9/2019 | Malik et al. | |

FOREIGN PATENT DOCUMENTS

| | | |
|---|---|---|
| EP | 0631453 | 12/2001 |
| WO | 9406103 | 3/1994 |
| WO | 9501707 | 1/1995 |
| WO | 9628948 | 9/1996 |
| WO | 9703533 | 1/1997 |
| WO | 98/32086 | 7/1998 |

OTHER PUBLICATIONS

Office Action From U.S. Appl. No. 14/514,381 (dated Dec. 31, 2014).

(56) References Cited

OTHER PUBLICATIONS

Office Action From U.S. Appl. No. 14/514,381 (dated May 13, 2015).
Office Action From U.S. Appl. No. 14/514,381 (dated Jan. 10, 2018).
Office Action From U.S. Appl. No. 14/514,381 (dated Apr. 2, 2018).
Office Action From U.S. Appl. No. 14/815,848 (dated Sep. 30, 2015).
Office Action From U.S. Appl. No. 14/815,848 (dated Mar. 14, 2016).
Office Action From U.S. Appl. No. 14/815,934 (dated Sep. 30, 2015).
Office Action From U.S. Appl. No. 14/815,934 (dated Feb. 11, 2016).
Office Action From U.S. Appl. No. 14/815,934 (dated Sep. 23, 2016).
Office Action From U.S. Appl. No. 14/815,934 (dated Apr. 7, 2017).
Office Action From U.S. Appl. No. 14/815,940 (dated Oct. 1, 2015).
Office Action From U.S. Appl. No. 14/815,940 (dated Dec. 28, 2017).
Office Action From U.S. Appl. No. 14/929,341 (dated Dec. 22, 2015).
Office Action From U.S. Appl. No. 14/929,341 (dated Feb. 4, 2016).
Office Action From U.S. Appl. No. 14/929,341 (dated Aug. 19, 2016).
Office Action From U.S. Appl. No. 14/929,341 (dated Jul. 31, 2018).
Office Action From U.S. Appl. No. 14/938,844 (dated Apr. 11, 2016).
Office Action From U.S. Appl. No. 14/938,844 (dated Jan. 25, 2017).
Office Action From U.S. Appl. No. 14/938,844 (dated May 1, 2017).
Office Action From U.S. Appl. No. 14/938,844 (dated Aug. 23, 2017).
Office Action From U.S. Appl. No. 14/935,742 (dated Mar. 2, 2016).
Office Action From U.S. Appl. No. 14/935,742 (dated Sep. 22, 2016).
Office Action From U.S. Appl. No. 14/935,742 (dated Mar. 29, 2017).
Office Action From U.S. Appl. No. 14/935,742 (dated May 31, 2017).
Office Action From U.S. Appl. No. 14/941,586 (dated Jan. 5, 2017).
Office Action From U.S. Appl. No. 14/941,586 (dated May 2, 2017).
Office Action From U.S. Appl. No. 14/956,392 (dated Feb. 2, 2016).
Office Action From U.S. Appl. No. 14/956,392 (dated Mar. 28, 2016).
Office Action From U.S. Appl. No. 14/956,392 (dated Nov. 3, 2016).
Office Action From U.S. Appl. No. 14/956,392 (dated May 3, 2017).
Office Action From U.S. Appl. No. 14/986,534 (dated May 20, 2016).
Office Action From U.S. Appl. No. 14/986,534 (dated Sep. 7, 2017).
Office Action From U.S. Appl. No. 14/517,771 (dated Jul. 15, 2015).
Office Action From U.S. Appl. No. 14/517,771 (dated Dec. 31, 2015).
Office Action From U.S. Appl. No. 14/517,771 (dated Sep. 8, 2016).
Office Action From U.S. Appl. No. 14/517,771 (dated Sep. 20, 2018).
Office Action From U.S. Appl. No. 14/517,863 (dated Feb. 5, 2015).
Office Action From U.S. Appl. No. 14/517,863 (dated Aug. 10, 2015).
Office Action From U.S. Appl. No. 14/675,453 (dated Jun. 9, 2015).
Office Action From U.S. Appl. No. 14/517,872 (dated Jan. 14, 2015).
Office Action From U.S. Appl. No. 14/517,872 (dated Jul. 31, 2015).
Office Action From U.S. Appl. No. 14/520,361 (dated Feb. 2, 2015).
Office Action From U.S. Appl. No. 14/520,361 (dated Jul. 17, 2015).
Office Action From U.S. Appl. No. 14/520,361 (dated Jul. 11, 2018).
Office Action From U.S. Appl. No. 14/521,386 (dated Jan. 29, 2015).
Office Action From U.S. Appl. No. 14/521,386 (dated Nov. 1, 2018).
Office Action From U.S. Appl. No. 14/521,667 (dated Jan. 2, 2015).
Office Action From U.S. Appl. No. 14/521,667 (dated Jun. 26, 2015).
Office Action From U.S. Appl. No. 14/634,786 (dated Oct. 2, 2015).
Office Action From U.S. Appl. No. 14/673,895 (dated Oct. 30, 2015).
Office Action From U.S. Appl. No. 14/673,895 (dated Feb. 12, 2016).
Office Action From U.S. Appl. No. 14/673,895 (dated Jul. 14, 2017).
Office Action From U.S. Appl. No. 14/673,895 (dated Oct. 2, 2017).
Office Action From U.S. Appl. No. 14/690,380 (dated Jul. 15, 2015).
Office Action From U.S. Appl. No. 14/690,380 (dated Dec. 3, 2015).
Office Action From U.S. Appl. No. 14/690,380 (dated Jun. 30, 2016).
Office Action From U.S. Appl. No. 14/690,380 (dated Nov. 17, 2016).
Office Action From U.S. Appl. No. 14/690,380 (dated Jun. 27, 2017).
Office Action From U.S. Appl. No. 14/690,380 (dated Nov. 20, 2017).
"10 Popular health care provider fraud schemes" by Charles Piper, Jan./Feb. 2013, Fraud Magazine, www.fraud-magazine com.
Report to the Nations on Occupational Fraud and Abuse, 2012 Global Fraud Study, copyright 2012, 76 pp., Association of Certified Fraud Examiners, Austin, TX.
Big Data Developments in Transaction Analytics, Scott Zoldi, Credit Scoring and Credit Control XIII Aug. 28-30, 2013 Fair Isaacs Corporation (FICO).
Credit card fraud detection using artificial neural networks tuned by genetic algorithms, Dissertation: Carsten A. W. Paasch, Copyright 2013 Proquest, LLC.
Fraud Detection Using Data Analytics in the Healthcare Industry, Discussion Whitepaper, ACL Services Ltd., (c) 2014, 8pp.
Fraud Detection of Credit Card Payment System by Genetic Algorithm, K.RamaKalyani, D. UmaDevi Department of Computer Science, Sri Mittapalli College of Engineering, Guntur, AP, India., International Journal of Scientific & Engineering Research vol. 3, Issue 7, Jul. 1, 2012 , ISSN 2229-5518.
Healthcare Fraud Detection, http://IJINIIW.21ct.com'solutions/healthcare-fraud-detection/, (c) 2013 21CT, Inc.
Prevent Real-time fraud prevention, brochure, Brighterion, Inc. San Francisco, CA.
"Agent-Based modeling: Methods and Techniques for Simulating Human Systems", Eric Bonabeau, Icosystem Dorporation, 545 Concord Avenue, Cambridge, MA 02138, 7280-7287; PNAS; May 14, 2002; vol. 99; suppl. 3; www.pnas.org/cgi/doi/10.1073/pnas.082080899.
RAID, Feb. 28, 2014, www.prepressure.com, printed through www.archive.org (Year: 2014).
Office Action From U.S. Appl. No. 14/522,463 (dated Mar. 24, 2020).
Office Action From U.S. Appl. No. 16/205,909 (dated Apr. 22, 2020).
Office Action From U.S. Appl. No. 16/398,917 (dated Mar. 11, 2020).
Office Action From U.S. Appl. No. 16/369,626 (dated Jun. 2, 2020).
Clarke et al., Dynamic Forecasting Behavior by Analysts Theory and Evidence, 2005, Journal of Financial Economics (Year:2005).
Data Compaction, 2013, Wikipedia, printed through www.archive.org (date is in the URL in YYYYMMDD format) (Year:2013).
Data Consolidation, 2014, Techopedia, printed through www.archive.org (date is in the URL in YYYYMMDD format) (Year:2014).
Data Mining Mar. 31, 2014. Wikipedia, Printed through www.archive.org, date is in the URL in YYYMMDD format (Year:2014).
Data Warehousing—Metadata Concepts, Mar. 24, 2014, TutorialsPoint, printed through www.archive.org (Date is in the URP in YYYMMDD format) (Year:2014).
Dave, Kushal, Steve Lawrence, and David M. Pennock. "Mining the peanut gallery: Opinion exliation and semantic classification of product reviews." Proceedings of the 12th international conference on Worldwide Web. ACM. 2003.
I Need Endless Rolling List, 2007, QuinStreet, Inc. (Year: 2007).
Office Action From U.S. Appl. No. 14/243,097 (dated Jun. 16, 2015).

(56) References Cited

OTHER PUBLICATIONS

Office Action From U.S. Appl. No. 14/243,097 (dated Nov. 5, 2018).
Office Action From U.S. Appl. No. 14/522,463 (dated Dec. 1, 2015).
Office Action From U.S. Appl. No. 14/522,463 (dated Feb. 11, 2019).
Office Action From U.S. Appl. No. 14/522,463 (dated Jun. 20, 2018).
Office Action From U.S. Appl. No. 14/522,463 (dated Jun. 5, 2015).
Office Action From U.S. Appl. No. 14/522,463 (dated Oct. 10, 2018).
Office Action From U.S. Appl. No. 14/613,383 (dated Apr. 23, 2018).
Office Action From U.S. Appl. No. 14/613,383 (dated Aug. 14, 2015).
Office Action From U.S. Appl. No. 14/613,383 (dated Dec. 13, 2018).
Yang,Yiming. "Expert network: Effective and efficient learning from human decisions in text categorization and retrieval." Proceedings of the 17th annual international ACM SIGIR conference on Research and development in Information retrieval Springer-Verlag New York, Inc., 1994.
"2000 Internet Fraud Statistics," National Fraud Information Center web site, http://www.fraud.org, 2001.
"AXENT Technologies' NetProwlerTM and Intruder AlertTM", Hurwitz Report, Hurwitz Group, Inc., Sep. 2000.
"CBA 1994 Fraud Survey," California Bankers Association web site, http://www.calbankers.com/legal/fraud.html, Jun. 1996.
"Check Fraud Against Businesses Proliferates," Better Business Bureau web site, http://www.bbb.org/library/checkfraud.asp, 2000.
"Check Fraud Statistics," National Check Fraud Center web site, http://www.ckfraud.org/statistics.html, Date Unkonwn.
"Consumers and Business Beware of Advance Fee Loan and Credit Card Fraud," Better Business Bureau web site, http://www.bbb.org/library/feeloan.asp, 20003.
"CyberSource Fraud Survey," CyberSource, Inc., web site, http://www.cybersource.com/solutions/risk_management/us_fraud_survey.xml, Date Unknown.
"EFalcon Helps E-Merchants Control Online Fraud," Financial Technology Insights Newsletter, HNC Software, Inc., Aug. 2000.
"Guidelines to Healthcare Fraud," National health care Anti-Fraud Association web site, http://www.nhcaa.org/factsheet_guideline.html, Nov. 19, 1991.
"Health Insurance Fraud," http://www.helpstopcrime.org, Date Unknown.
"HIPPA Solutions: Waste, Fraud, and Abuse," ViPS, Inc., web site, http://www.vips.com/hippa/combatwaste.html, 2001.
"HNC Insurance Solutions Introduces Spyder Software for Healthcare Fraud and Abuse Containment," HNC Software, Inc., press release, Dec. 4, 1998.
"Homeowners Insurance Fraud," http://www.helpstopcrime.org, Date Unknown.
"Insurance Fraud: The Crime You Pay For," http://www.insurancefraud.org/facts.html, Date Unknown.
"PRISM FAQ", Nestor, Inc., www.nestor.com, Date Unknown.
"SET Secure Electronic Transaction Sepcification," Book 1: Business Description, May 1997.
"Telemarketing Fraud Revisited," Better Business Bureau web site, http://www.bbb.org/library/tele.asp, 2000.
"The Impact of Insurance Fraud," Chapter 5, Ohio Insurance Facts, Ohio Insurance Institute, 2000.
"VeriCompTM Claimant," HNC Software, Inc., web site, 2001.
"What is Insurance Fraud?," http://www.helpstopcrime.rog, Date Unkonwn.
"Wireless Fraud FAQ," World of Wireless Communications web site, http://www.wow-com/consumer/faq/articles.cfm?textonly=1&ID=96, Date Unknown.
"Workers Compensation Fraud," http://www.helpstopcrime.org, Date Unknown.

A. Aadjaoute, "Responding to the e-Commerce Promise with Non-Algorithmic Technology," Handbook of E-Business, Chapter F2, edited by J. Keyes, Jul. 2000.
A. Valdes and H. Javitz,"The SRI IDES Statistical Anomaly Detector," May 1991.
D. Anderson, T. Frivold, and A. Valdes, "NExt-Generation intrusion Detection Expert System (NIDES): A Summary," SRI Computer Science Laboratory technical report SRI-CSL-95-07, May 1995.
Debar et al.,"Neural network Component for an Intrustion Detection System", Proceedings for the Computer Society Symposium on Research in Security and Privacy, vol. SYMP.13, May 4, 1992, 240-250.
Denault et al., "Intrusion Detection: approach and performance issues of the SECURENET system", Computers and Security, 13 (1994), 495-508.
John J. Xenakis, 1990, InformationWeek, 1990. n296,22.
K. G. DeMarrais, "Old-fashioned check fraud still in vogue," Bergen record Corp. web site, http://www.bergen.com/biz/savvy24200009242.htm, Sep. 24, 2000.
M. B. Guard, "Calling Card Fraud—Travelers Beward!," http://www.bankinfo.com/security/scallingcardhtml, Jun. 11, 1998.
Maria Seminerio, Dec. 13, 1999, PC week, 99.
Office Action from U.S. Appl. No. 09/810,313 (dated Jun. 22, 2005).
Office Action From U.S. Appl. No. 16/677,458 (dated Sep. 24, 2020).
Office Action From U.S. Appl. No. 16/226,246 (dated Aug. 4, 2020).
Office Action From U.S. Appl. No. 16/184,894 (dated Sep. 21, 2020).
Office Action From U.S. Appl. No. 16/592,249 (dated Sep. 14, 2020).
Office Action From U.S. Appl. No. 16/601,226 (dated Sep. 2, 2020).
Office Action From U.S. Appl. No. 16/674,980 (dated Sep. 3, 2020).
Office Action From U.S. Appl. No. 16/855,131 (dated Sep. 24, 2020).
Office Action From U.S. Appl. No. 16/679,819 (dated Sep. 25, 2020).
Office Action from U.S. Appl. No. 16/424,187 (dated Feb. 26, 2021).
Office Action from U.S. Appl. No. 16/226,246 (dated Dec. 15, 2020).
Ex Parte Quayle Action from U.S. Appl. No. 16/369,626 (dated Jan. 7, 2021).
Office Action From U.S. Appl. No. 16/264,144 (dated Oct. 16, 2020).
Office Action From U.S. Appl. No. 15/866,563 (dated Nov. 27, 2020).
Office Action from U.S. Appl. No. 16/743,009 (dated Mar. 24, 2021).
Office Action from U.S. Appl. No. 16/226,246 (dated Apr. 26, 2021).
Office Action from U.S. Appl. No. 16/264,144 (dated Apr. 23, 2021).
Office Action from U.S. Appl. No. 16/663,452 (dated Mar. 12, 2021).
Office Action from U.S. Appl. No. 16/743,009 (dated Sep. 10, 2021).
Office Action from U.S. Appl. No. 16/264,144 (dated Sep. 22, 2021).
Office Action from U.S. Appl. No. 16/424,187 (dated Sep. 1, 2021).
Office Action from U.S. Appl. No. 16/663,452 (dated Aug. 17, 2021).
Office Action from U.S. Appl. No. 09/810,313 (dated Mar. 24, 2006).
Office Action from U.S. Appl. No. 09/810,313 (dated Nov. 23, 2004).
Office Action from U.S. Appl. No. 11/455,146 (dated Sep. 29, 2009).
P.A. Porras and P.G. Neumann, "EMERALD: Event Monitoring Enabling Responses to Anomalous Live Disturbances," National Information Systems Security Conference, Oct. 1997.
P.E. Proctor, "Computer Misuse Detection System (CMDSTM) Concpets," SAIC Science and technology Trends, pp. 137-145, Dec. 1996.

(56) References Cited

OTHER PUBLICATIONS

S. Abu-Hakima, M. ToLoo, and T. White, "A Multi-Agent Systems Approach for Fraud Detection in Personal Communication Systems," Proceedings of the Fourteenth National Conference on Artificial Intelligence (AAAI-97), pp. 1-8, Jul. 1997.
Teng et al., "Adaptive real-time anomaly detection using inductively generated sequential patterns", Proceedings of the Computer Society Symposium on research in Security and Privacy, vol. SYMP. 11, May 7, 1990, 278-284.
Office Action from U.S. Appl. No. 14/522,463 (dated Oct. 3, 2019).
Office Action from U.S. Appl. No. 14/522,463 (dated Jul. 18, 2019).
Office Action From U.S. Appl. No. 16/205,909 (dated Dec. 27, 2019).
Office Action From U.S. Appl. No. 16/205,909 (dated Sep. 27, 2019).
Office Action From U.S. Appl. No. 16/398,917 (dated Sep. 26, 2019).
Office Action From U.S. Appl. No. 15/947,790 (dated Nov. 18, 2019).
Office Action From U.S. Appl. No. 14/525,273 (dated Jun. 26, 2018).
Office Action From U.S. Appl. No. 14/525,273 (dated Feb. 9, 2015).
Office Action From U.S. Appl. No. 14/525,273 (dated May 19, 2015).
Office Action From U.S. Appl. No. 15/968,568 (dated Sep. 16, 2019).
Office Action From U.S. Appl. No. 15/961,752 (dated Oct. 3, 2019).

\* cited by examiner

ARTIFICIAL INTELLIGENCE FRAUD MANAGEMENT SOLUTION

RELATED APPLICATIONS

The current patent application s a continuation of and claims priority benefit to earlier-filed, identically-titled, non-provisional patent application Ser. No. 14/514,381, filed Oct. 15, 2014, which is a continuation-in-part of and claims priority benefit to earlier-filed non-provisional patent application Ser. No. 14/454,749, entitled HEALTHCARE FRAUD PREEMPTION, filed Aug. 8, 2014 (now issued U.S. Pat. No. 9,779,407), and the entirety of each of the foregoing is hereby incorporated by reference into the current application.

BACKGROUND OF THE INVENTION

Field of the Invention

The present invention relates to automation tools for the application development of fraud management systems, and more particularly to multi-discipline artificial intelligence machines for real-time use on big data.

Background

Anyone impressed by the increasing and stunning speeds of computers, or stunned by their unfailing memory capacity, will not be able to find any manifestations of intelligence as long as everything remains purely algorithmic.

Algorithmic programs are deductive ensembles of successive operations applied in a fixed order. An algorithm brings the computer to repeat, tirelessly and accurately, long suites of logical operations. However, such programs will neither know how to take any initiative, nor will any ever stray away from a fixed line of march.

Algorithmic programmers must always be able to dictate the precise succession of steps that the target machine is to follow. But, you cannot ask any expert to predict all of the risk events that may befall a company or business in the next day, month, or year. And so it is for every field that requires the use of experts.

Since every algorithm requires an exhaustive enumeration the vast majority of industrial problems will be excluded from computer science. Industrial problems in which the resolution requires a minimum of reasoning cannot be transcribed into an algorithmic form. This is also true for programs based on artificial intelligence, like expert systems and conventional object oriented languages. In the case of expert systems, all the possibilities must be predicted in order to write all the possible rules. Such is obviously impossible. In conventional object oriented languages, all possible methods must be forecast, known and programmed for.

In the case of business, decisions integrate and often concern an important number of variables that dynamically come and go.

What is needed is a technology that goes beyond algorithmic techniques, ones that know how to resolve very complex problems without needing to be instructed on how to resolve them.

SUMMARY OF THE INVENTION

Briefly, an artificial intelligence fraud management solution embodiment of the present invention comprises an expert programmer development system to build trainable general payment fraud models that integrate several artificial intelligence classifiers like neural networks, case based reasoning, decision trees, genetic algorithms, fuzzy logic, and rules and constraints. These are further integrated by the expert programmers and development system with smart agents and associated real-time profiling, recursive profiles, and long-term profiles. The trainable general payment fraud models are trained with supervised and unsupervised data to produce an applied payment fraud model. This then is applied by a commercial client to process real-time transactions and authorization requests for fraud scores.

Thus, an application development system is provided that is computer implemented, artificial intelligence based, and machine learning based. The system includes: means for building trainable general payment fraud models that integrate several different classification models; means for including an initial set of run-time smart agents, neural networks, case-based reasoning, decision trees, and business rules in said trainable general payment fraud models; means for enabling said trainable general payment fraud models to be trained with historical transaction data; means for subsequently generating from said historical transaction data an initial population of smart agents and associated profiles and including them in said trainable general payment fraud models; means for subsequently generating from said historical transaction data an initial set of neural networks with a beginning weight matrix and including them in said trainable general payment fraud models; means for subsequently structuring from said historical transaction data an initial case-based reasoning set and an initial set of business rules and including them in said trainable general payment fraud models; and means for subsequently detaching said trainable general payment fraud models and for using them on a target application system, wherein, trainable general payment fraud models can be sold as products to customers to use on their computer systems to control payment fraud.

In some instances, the trainable general payment fraud models further comprise means for embedding an incremental learning technology and smart-agent technology able to continually re-train artificial intelligence classifiers. The incremental learning technology may further comprises: means for incrementally changing any initial decision trees by creating new links or updating existing links and weights; means for run-time updating of a weighting matrix of any initial neural network; any initial case-based reasoning logic to update its generic cases or create new ones; and/or means for self-updating said initial population of smart-agents profiles and for creating exceptions to adjust their normal/abnormal thresholds.

The detachable and trainable general payment fraud models may further comprise: means for producing an independent and separate vote or fraud score from each of said classification models, population of smart agents, and profilers; means for weighting and summing together each said independent and separate vote or fraud score; and means for outputting a final fraud score.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
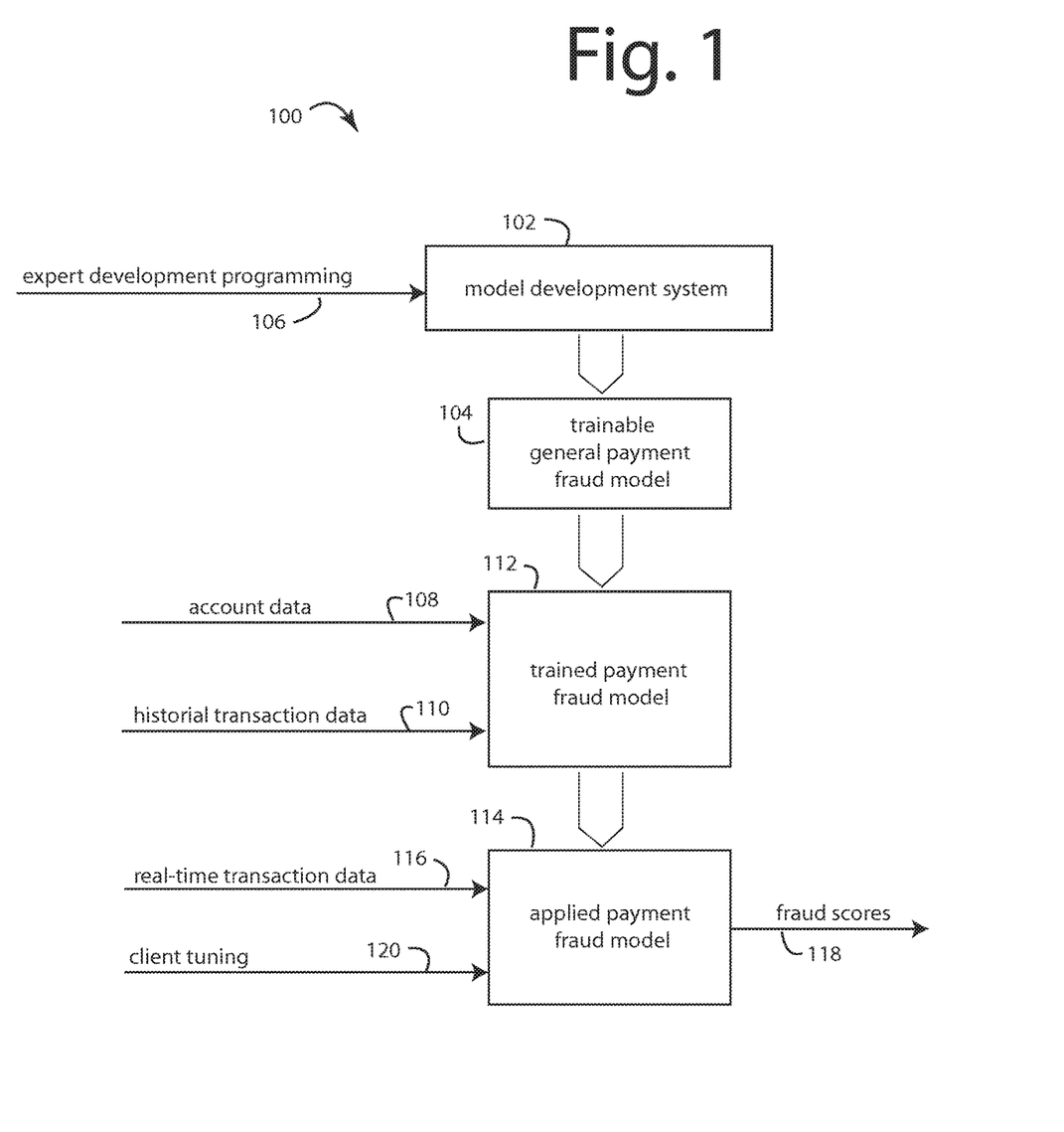
FIG. 1 is functional block diagram of an artificial intelligence fraud management solution embodiment of the present invention.

FIG. 1 represents an artificial intelligence fraud management solution embodiment of the present invention, and is referred to herein by the general reference numeral 100. Such solution 100 comprises an expert programmer development system 102 for building trainable general payment fraud models 104 that integrate several, but otherwise blank artificial intelligence classifiers, e.g., neural networks, case based reasoning, decision trees, genetic algorithms, fuzzy logic, and rules and constraints. These are further integrated by the expert programming inputs 106 and development system 102 to include smart agents and associated real-time profiling, recursive profiles, and long-term profiles.

The trainable general payment fraud models 104 are trained with supervised and unsupervised data 108 and 110 to produce a trained payment fraud model 112. For example, accountholder and historical transaction data. This trained payment fraud model 112 can then be sold as a computer program library or a software-as-a-service applied payment fraud model. This then is applied by a commercial client in an applied payment fraud model 114 to process real-time transactions and authorization requests 116 for fraud scores. The applied payment fraud model 114 is further able to accept a client tuning input 120.

Figure 2A:
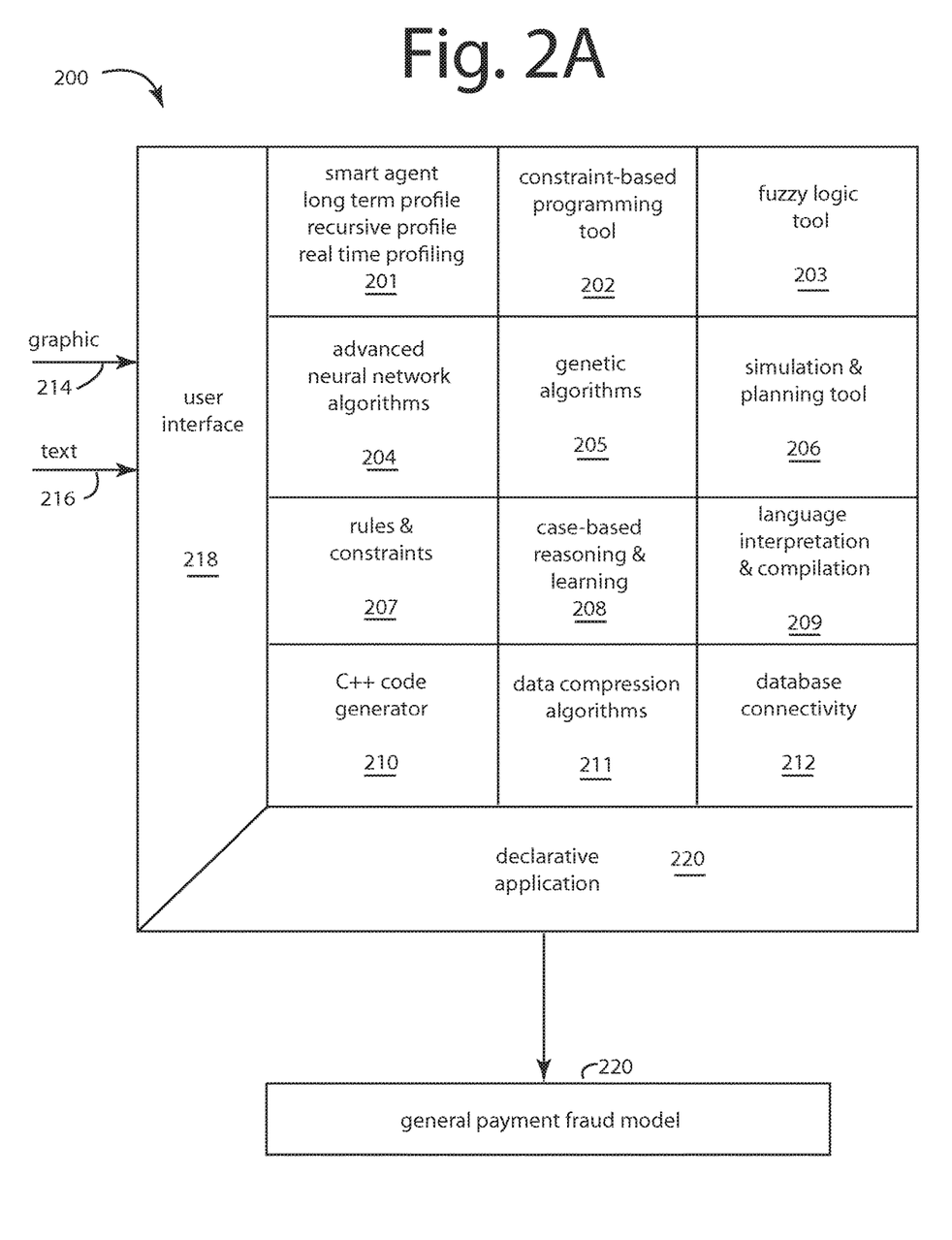
FIG. 2A is functional block diagram of an application development system (ADS) embodiment of the present invention for fraud-based target applications.

FIG. 2A represents an application development system (ADS) embodiment of the present invention for fraud-based target applications, and is referred to herein by the general reference numeral 200. Such is the equivalent of development system 102 in FIG. 1. ADS 200 comprises a number of computer program development libraries and tools that highly skilled artificial intelligence scientists and artisans can manipulate into a novel combination of complementary technologies. In an early embodiment of ADS 200 we combined a goal-oriented multi-agent technology 201 for building run-time smart agents, a constraint-S based programming tool 202, a fuzzy logic tool 203, a library of genetic algorithms 205, a simulation and planning tool 206, a library of business rules and constraints 207, case-based reasoning and learning tools 208, a real-time interpreted language compiler 209, a C++ code generator 210, a library of data compression algorithms 211, and a database connectivity tool 212.

The highly skilled artificial intelligence scientists and artisans provide graphical and textual inputs 214 and 216 to a user interface. (UI) 218 to manipulate the novel combinations of complementary technologies into a declarative application 220.

Declarative application 214 is molded, modeled, simulated, tested, corrected, massaged, and unified into a fully functional hybrid combination that is eventually output as a trainable general payment fraud model 222. Such is the equivalent of trainable general payment fraud model 104 in FIG. 1.

It was discovered by the present inventor that the highly skilled artificial intelligence scientists and artisans that could manipulate the complementary technologies mentioned into specific novel combinations required exceedingly talented individuals that were in short supply.

It was, however, possible to build and to prove out that ADS 200 as a compiler would produce trainable general payment fraud models 220, and these were more commercially attractive and viable.

After many years of experimental use and trials, ADS 200 was constantly improved and updated. Database connectivity tool 212, for example, tried to press conventional databases into service during run-time to receive and supply data points in real-time transaction service. It turned out no conventional databases were up to it.

Figure 2B:
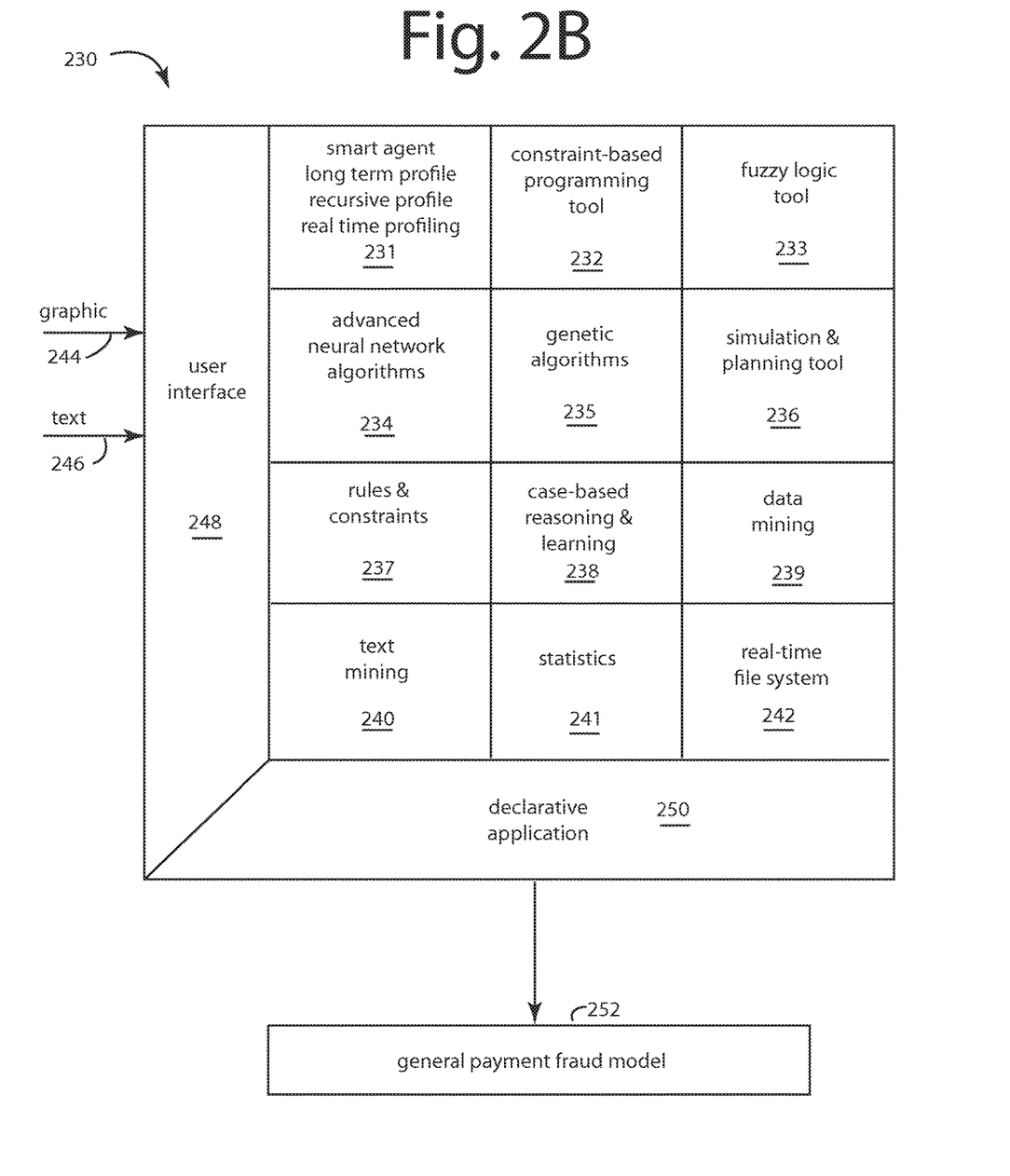
FIG. 2B is functional block diagram of an improved and updated application development system (ADS) embodiment of the present invention for fraud-based target applications.

At the present, an updated and improved ADS shown with general reference numeral 230 in FIG. 2B is providing better and more useful trainable general payment fraud models.

ADS 230 is the most recent equivalent of development system 102 in FIG. 1. ADS 230 assembles together a different mix of computer program development libraries and tools for the highly skilled artificial intelligence scientists and artisans to manipulate into a new hybrid of still complementary technologies.

In this later embodiment, ADS 230, we combined an improved smart-agent technology 231 for building run-time smart agents that are essentially only silhouettes of their constituent attributes. These attributes are themselves smart-agents with second level attributes and values that are able to "call" on real-time profilers, recursive profilers, and long term profilers. Such profilers can provide comparative assessments of each data point with the new information flowing in during run-time.

The three profilers can thereafter throw exceptions in each data point category, and the number and quality of exceptions thrown across the breadth of the attributes then incoming will produce a fraud risk score that generally raises exponentially with that number of exceptions thrown. Oracle explains in C++ programming that exceptions provide a way to react to exceptional circumstances (like fraud suspected) in programs by transferring control to special functions called "handlers".

At the top level of a hierarchy of smart agents linked by their attributes are the smart agents for the independent actors who can engage in fraud. In a payment fraud model, that top level will be the cardholders as tracked by the cardholder account numbers reported in transaction data.

These top level smart agents can call on a moving 15-minute window file that has all the transactions reported to the system in the last 15-minutes. Too much activity in 15-minutes by any one actor is cause for further inspection and analysis.

ADS 230 further comprises a constraint-based programming tool 232, a fuzzy logic tool 233, a library of advanced neural network algorithms 234, a library of genetic algorithms 235, a simulation and planning tool 236, a library of business rules and constraints 237, case-based reasoning and learning tools 238, a data mining tool 239, a text mining tool 240, a statistical tool 241 and a real-time file system 242.

The real-time file system 242 is a simple organization of attribute values for smart agent profilers that allow quick, direct file access.

The highly skilled artificial intelligence scientists and artisans provide graphical and textual inputs 244 and 246 to a user interface (UI) 248 to manipulate the novel combinations of complementary technologies into a declarative application 250.

Declarative application 250 is also molded, modeled, simulated, tested, corrected, massaged, and unified into a fully functional hybrid combination that is eventually output as a trainable general payment fraud model 252. Such is also the more improved equivalent of trainable general payment fraud model 104 in FIG. 1.

The constraint-based programming tools 202 and 232 limit the number of possible solutions. Complex conditions with complex constraints can create an exponential number of possibilities. Fixed constraints, fuzzy constraints, and polynomials are combined in cases where no exact solution exists. New constraints can be added or deleted at any time. The dynamic nature of the tool makes possible real-time simulations of complex plans, schedules, and diagnostics.

The constraint-based programming tools are written as a very complete language in its own right. It can integrate a variety of variables and constraints, as in the following Table.

---

Variables: Real, with integer values, enumerated, sets, matrices and vectors, intervals, fuzzy subsets, and more.

Arithmetic constraints: =, +, −, *, /, /=, >, <, >=, <=, interval addition, interval subtraction, interval multiplication and interval division, max, min, intersection, union, exponential, modulo, logarithm, and more.

Temporal (Allen) Constraints: Control allows you to write any temporal constraints including Equal, N-equal, Before, After, Meets, Overlaps, Starts, Finishes, and personal temporal operators such as Disjoint, Started-by, Overlapped-by, Met-by, Finished-by, and more.

Boolean Constraints: Or, And, Not, Xor, Implication, Equivalence

Symbolic Constraints: Inclusion, Union, Intersection, Cardinality, Belonging, and more.

---

The constraint-based programming tools 202 and 232 include a library of ways to arrange subsystems, constraints and variables. Control strategies and operators can be defined within or outside using traditional languages such as C, C++, FORTRAN, etc. Programmers do not have to learn a new language, and provides an easy-to-master programming interface by providing an in-depth library and traditional tools.

Fuzzy logic tools 203 and 233 recognize many of the largest problems in organizations cannot be solved by simple yes/no or black/white answers. Sometimes the answers need to be rendered in shades of gray. This is where fuzzy logic proves useful. Fuzzy logic handles imprecision or uncertainty by attaching various measures of credibility to propositions. Such technology enables clear definitions of problems where only imperfect or partial knowledge exists, such as when a goal is approximate, or between all and nothing. In fraud applications, this can equate to the answer being "maybe" fraud is present, and the circumstances warrant further investigation.

Tools 204 and 234 provides twelve different neural network algorithms, including Back propagation, Kohonen, Art, Fuzzy ART, RBF and others, in an easy-to-implement C++ library. Neural networks are algorithmic systems that interpret historical data to identify trends and patterns against which to compare subject cases. The libraries of advanced neural network algorithms can be used to translate databases to neurons without user intervention, and can significantly accelerate the speed of convergence over conventional back propagation, and other neural network algorithms. The present invention's neural net is incremental and adaptive, allowing the size of the output classes to change dynamically. An expert mode in the advanced application development tool suite provides a library of twelve different neural network models for use in customization.

Neural networks can detect trends and patterns other computer techniques are unable to. Neurons work collaboratively to solve the defined problem. Neural networks are adept in areas that resemble human reasoning, making them well suited to solve problems that involve pattern recognition and forecasting. Thus, neural networks can solve problems that are too complex to solve with conventional technologies.

Libraries 205 and 235 include genetic algorithms to initialize a population of elements where each element represents one possible set of initial attributes. Once the models are designed based on these elements, a blind test performance is used as the evaluation function. The genetic algorithm will be then used to select the attributes that will be used in the design of the final models. The component particularly helps when multiple outcomes may achieve the same predefined goal. For instance, if a problem can be solved profitably in any number of ways, genetic algorithms can determine the most profitable way.

Simulation and planning tool 206 can be used during model designs to check the performances of the models.

Business rules and constraints 207 provides a central storage of best practices and know how that can be applied to current situations. Rules and constraints can continue to be captured over the course of years, applying them to the resolution of current problems.

Case-based reasoning 208 uses past experiences in solving similar problems to solve new problems. Each case is a history outlined by its descriptors and the steps that lead to a particular outcome. Previous cases and outcomes are stored and organized in a database. When a similar situation presents itself again later, a number of solutions that can be tried, or should be avoided, will present immediately. Solutions to complex problems can avoid delays in calculations and processing, and be offered very quickly.

Language interpretation tool 209 provides a constant feedback and evaluation loop. Intermediary Code generator 210 translates Declarative Applications 214 designed by any expert into a faster program 230 for a target host 232.

During runtime, real time transaction data 234 can be received and processed according to declarative application 214 by target host 232 with the objective of producing run-time fraud detections 236. For example, in a payments application card payments transaction requests from merchants can be analyzed for fraud activity. In healthcare applications the reports and compensation demands of providers can be scanned for fraud. And in insider trader applications individual traders can be scrutinized for special knowledge that could have illegally helped them profit from stock market moves.

File compression algorithms library 211 helps preserve network bandwidth by compressing data at the user's discretion.

Figure 3:
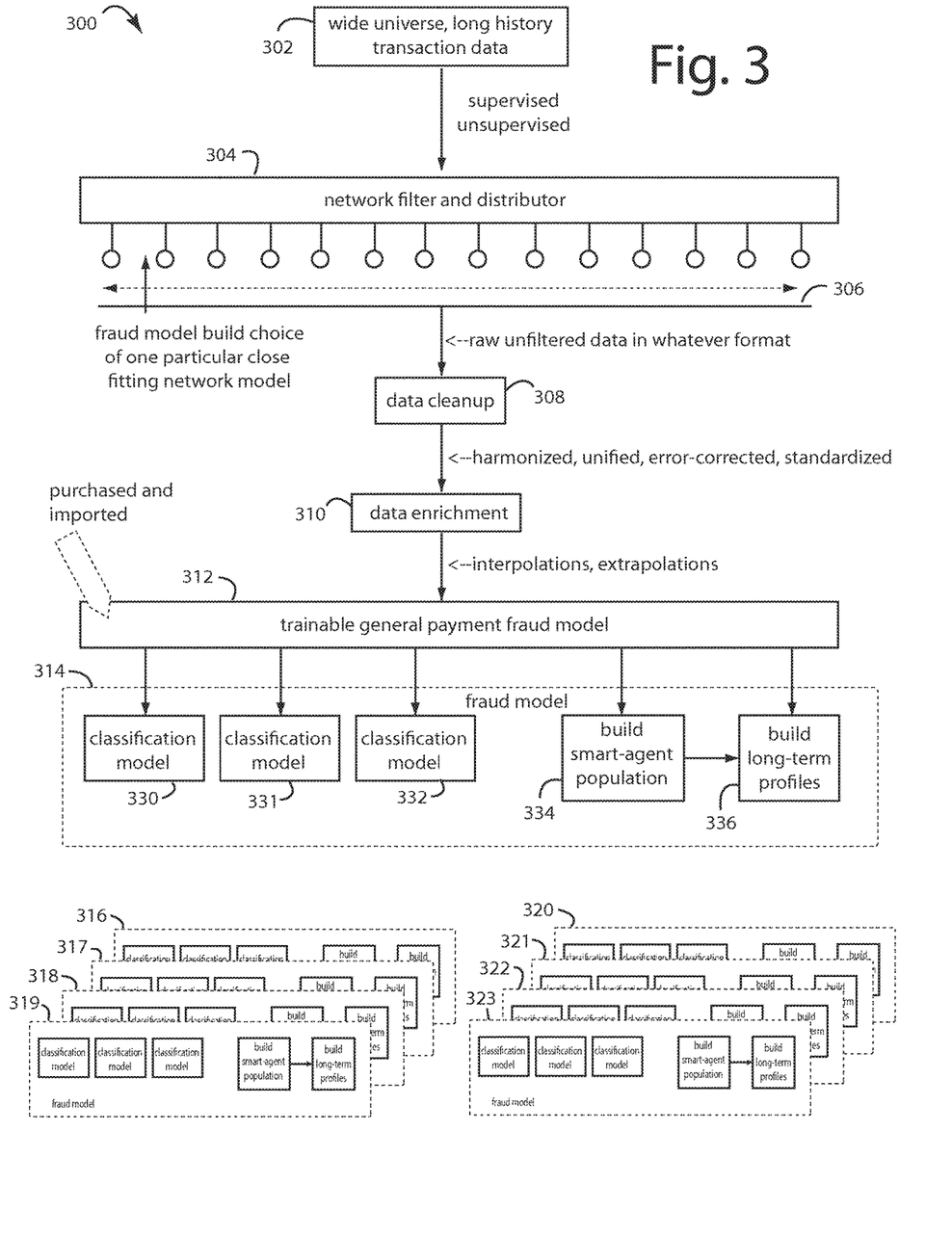
FIG. 3 is functional block diagram of a model training embodiment of the present invention.

FIG. 3 represents a model training embodiment of the present invention, and is referred to herein by the general reference numeral 300. Model trainer 300 can be fed a very complete, comprehensive transaction history 302 that can include both supervised and unsupervised data. A filter 304 actually comprises many individual filters that can be selected by a switch 306. Each filter can separate the supervised and unsupervised data from comprehensive transaction history 302 into a stream correlated by some factor in each transaction.

The resulting filtered training data will produce a trained model that will be highly specific and sensitive to fraud in the filtered category. When two or more of these specialized trained models used in parallel are combined in other embodiments of the present invention they will excel in real-time cross-channel fraud prevention.

In a payment card fraud embodiment of the present invention, the filters 304 are selected by switch 306 to filter through card-not-present transactions, card-present transactions, international transactions, domestic transactions, debit card transactions, credit card transactions, contactless transactions, or other groupings or financial networks.

A data cleanup process 308 is used to harmonize, unify, error-correct, and otherwise standardize the data coming from transaction data history 302. The commercial advantage of that is clients can provide their transaction data histories 302 in whatever formats and file structures are natural to the provider.

A data enrichment process 310 computes interpolations and extrapolations of the data and produces as many as two-hundred and fifty data points from the forty or so relevant data points originally provided by transaction data history 302.

A trainable fraud model 312, like that illustrated in FIG. 1 as trainable general payment fraud model 104, is trained. Such can be imported as a purchased commercial product or library.

A selected applied fraud model 314, like that illustrated in FIG. 1 as applied fraud model 114, results from the selected training that results from the switch 306 setting and the filters 304. A variety of selected applied fraud models 316-323 represent the applied fraud models 114 that result with different settings of filter switch 306. Each selected applied fraud model 314 will include a hybrid of artificial intelligence classification models represented by models 330-332 and a smart-agent population build 334 with a corresponding set of real-time, recursive, and long-term profilers 336. The enriched data from data enrichment process 310 is fully represented in the smart-agent population build 334 and profilers 336.

Figure 4:
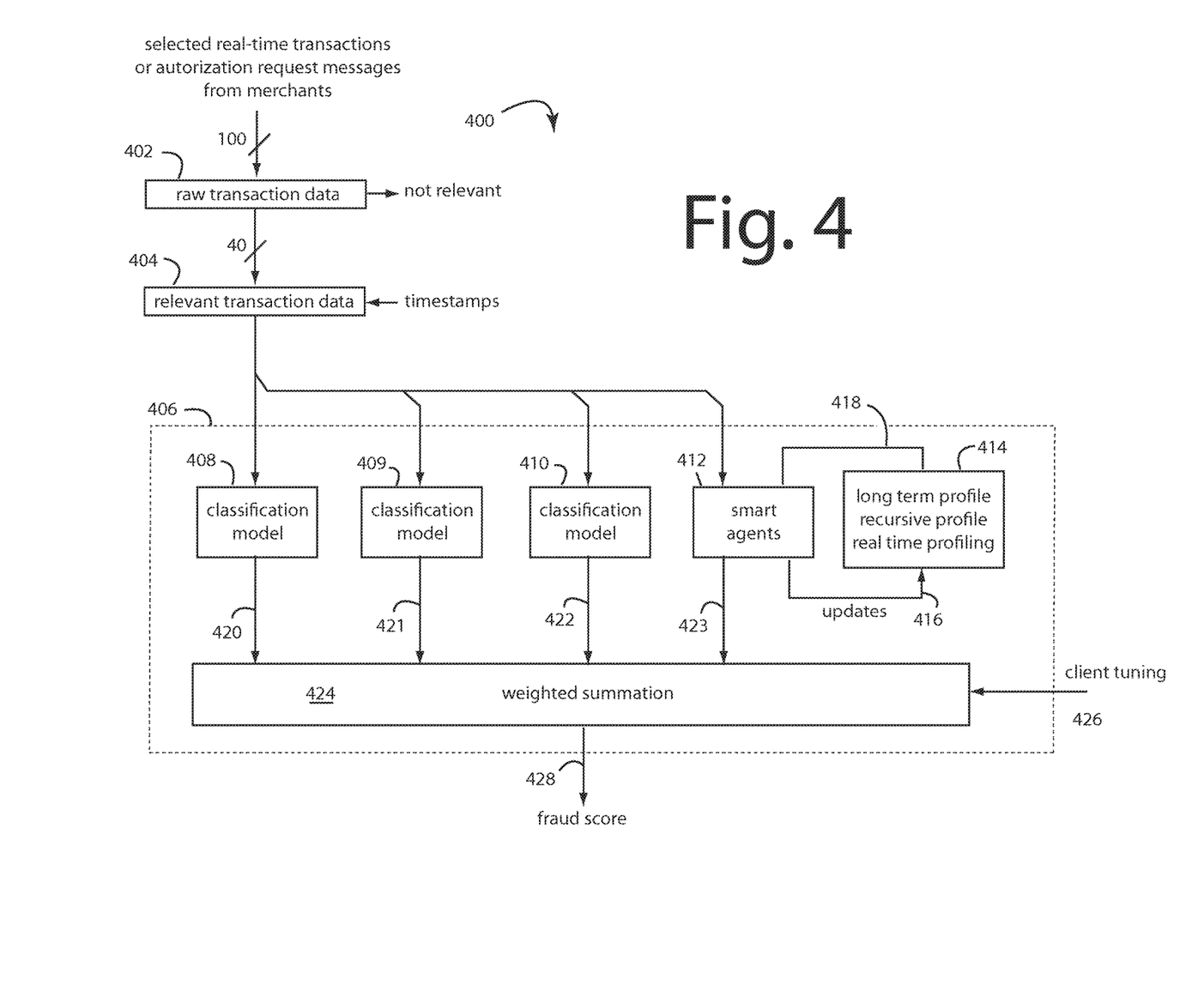
FIG. 4 is functional block diagram of a real-time payment fraud management system like that illustrated in FIG. 1 as applied payment fraud model.

FIG. 4 represents a real-time payment fraud management system 400 like that illustrated in FIG. 1 as applied payment fraud model 114. A raw transaction separator 402 filters through the forty or so data items that are relevant to the computing of a fraud score. A process 404 adds timestamps to these relevant data points and passes them in parallel to a selected applied fraud model 406. This is equivalent to a selected one of applied fraud models 316-323 in FIG. 3 and applied payment fraud model 114 in FIG. 1.

During a session in which the time-stamped relevant transaction data flows in, a set of classification models 408-410 operate independently according to their respective natures. A population of smart agents 412 and profilers 414 also operate on the time-stamped relevant transaction data inflows. Each new line of time-stamped relevant transaction data will trigger an update 416 of the respective profilers 414. Their attributes 418 are provided to the population of smart agents 412.

The classification models 408-410 and population of smart agents 412 and profilers 414 all each produce an independent and separate vote or fraud score 420-423 on the same line of time-stamped relevant transaction data. A weighted summation processor 424 responds to client tunings 426 to output a final fraud score 428.

Figure 5:
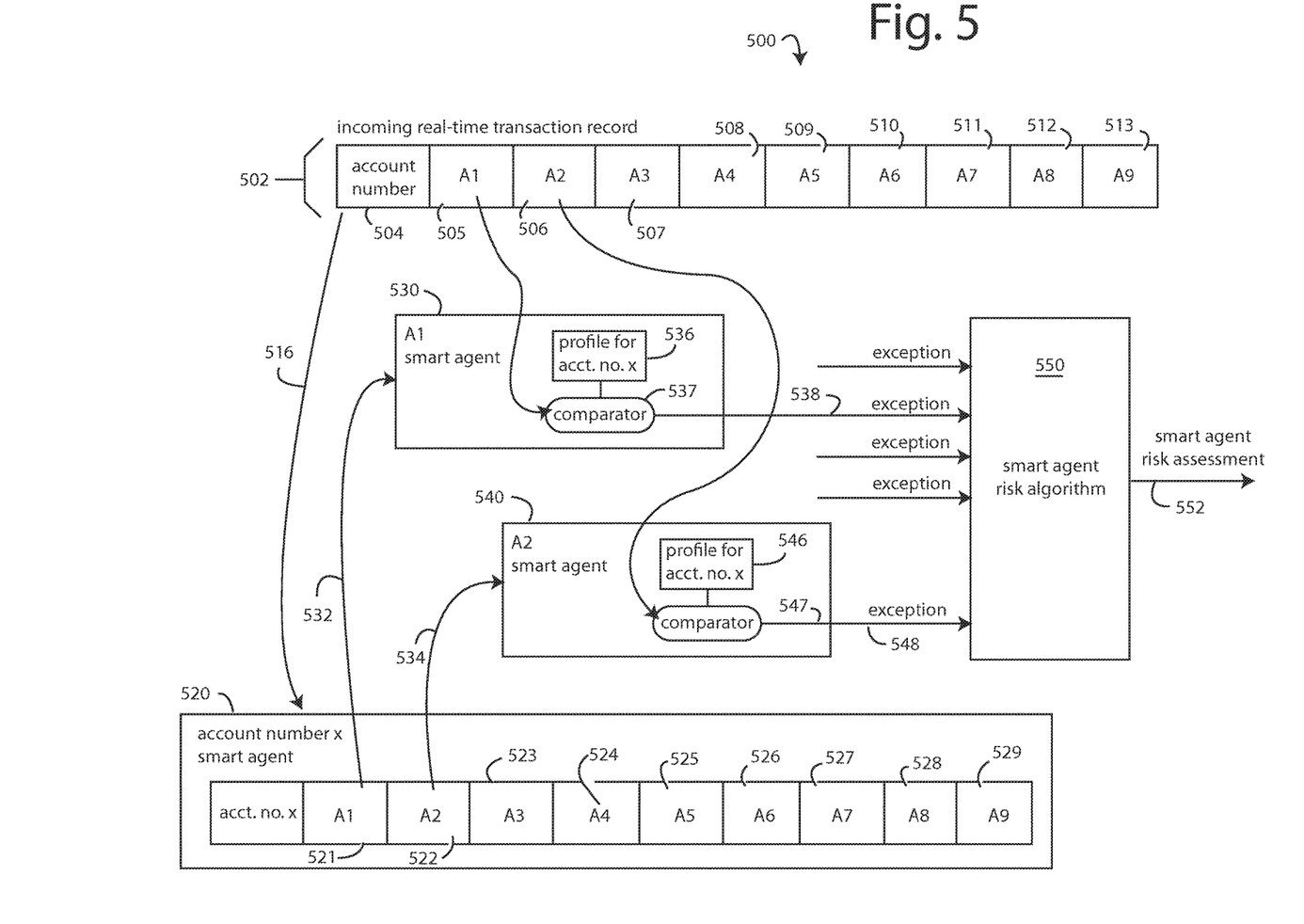
FIG. 5 is functional block diagram of a smart agent process embodiment of the present invention.

FIG. 5 represents a smart agent process 500 in an embodiment of the present invention. For example, these would include the smart agent population build 334 and profiles 336 in FIG. 3 and smart agents 412 and profiles 414 in FIG. 4. A series of payment card transactions arriving in real-time in an authorization request message is represented here by a random instantaneous incoming real-time transaction record 502.

Such record 502 begins with an account number 504. It includes attributes A1-A9 numbered 505-513 here. These attributes, in the context of a payment card fraud application would include data points for card type, transaction type, merchant name, merchant category code (MCC), transaction amount, time of transaction, time of processing, etc.

Account number 504 in record 502 will issue a trigger 516 to a corresponding smart agent 520 to present itself for action. Smart agent 520 is simply a constitution of its attributes, again A1-A9 and numbered 521-529 in FIG. 5. These attributes A1-A9 521-529 are merely pointers to attribute smart agents. Two of these, one for A1 and one for A2, are represented in FIG. 5. Here, an A1 smart agent 530 and an A2 smart agent 540. These are respectively called into action by triggers 532 and 542.

A1 smart agent 530 and A2 smart agent 540 will respectively fetch correspondent attributes 505 and 506 from incoming real-time transaction record 502. Smart agents for A3-A9 make similar fetches to themselves in parallel. They are not shown here to reduce the clutter for FIG. 5 that would otherwise result.

Each attribute smart agent like 530 and 540 will include or access a corresponding profile data point 536 and 546. This is actually a simplification of the three kinds of profiles 336 (FIG. 3) that were originally built during training and updated in update 416 (FIG. 4). These profiles are used to track what is "normal" behavior for the particular account number for the particular single attribute.

For example, if one of the attributes reports the MCC's of the merchants and another reports the transaction amounts, then if the long-term, recursive, and real time profiles for a particular account number x shows a pattern of purchases at the local Home Depot and Costco that average $100-$300, then an instantaneous incoming real-time transaction record 502 that reports another $200 purchase at the local Costco will raise no alarms. But a sudden, unique, inexplicable purchase for $1250 at a New York jeweler will and should throw more than one exception.

Each attribute smart agent like 530 and 540 will further include a comparator 537 and 547 that will be able to compare the corresponding attribute in the instantaneous incoming real-time transaction record 502 for account number x with the same attributes held by the profiles for the same account. Comparators 537 and 547 should accept some slack, but not too much. Each can throw an exception 538 and 548, as can the comparators in all the other attribute smart agents. It may be useful for the exceptions to be a fuzzy value, e.g., an analog signal 0.0 to 1.0. Or it could be a simple binary one or zero. What sort of excursions should trigger an exception is preferably adjustable, for example with client tunings 426 in FIG. 4.

These exceptions are collected by a smart agent risk algorithm 550. One deviation or exception thrown on any one attribute being "abnormal" can be tolerated if not too egregious. But two or more should be weighted more than just the simple sum, e.g., $(1+1)n=2n$ instead of simply $1+1=2$. The product is output as a smart agent risk assessment 552. This output is the equivalent of independent and separate vote or fraud score 423 in FIG. 4.

Figure 6:
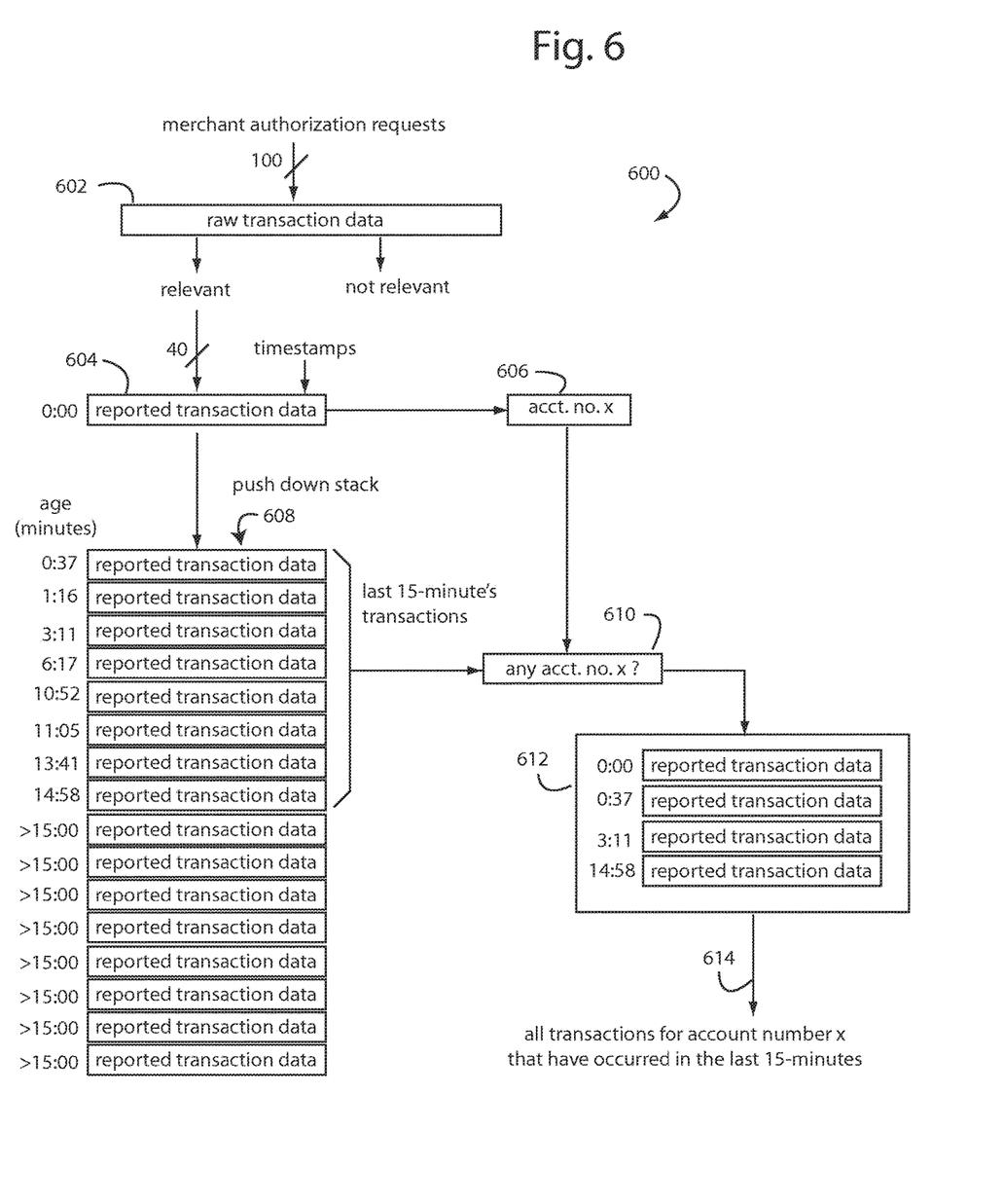
FIG. 6 is functional block diagram of a most recent 15-minute transaction velocity counter.

FIG. 6 represents a most recent 15-minute transaction velocity counter 600, in an embodiment of the present invention. It receives the same kind of real-time transaction data inputs as were described in connection with FIG. 4 as raw transaction data 402 and FIG. 5 as records 502. A raw transaction record 602 includes a hundred or so data points. About forty of those data points are relevant to fraud detection an identified in FIG. 6 as reported transaction data 604.

The reported transaction data 604 arrive in a time series and randomly involve a variety of active account numbers. But, let's say the most current reported transaction data 604 with a time age of 0:00 concerns a particular account number x. That fills a register 606.

Earlier arriving reported transaction data 604 build a transaction time-series stack 608. FIG. 6 arbitrarily identifies the respective ages of members of transaction time-series stack 608 with example ages 0:73, 1:16, 3:11, 6:17, 10:52, 11:05, 13:41, and 14:58. Those aged more than 15-minutes are simply identified with ages ">15:00". This embodiment of the present invention is concerned with only the last 15-minutes worth of transactions. As time passes transaction time-series stack 608 pushes down.

The key concern is whether account number x has been involved in any other transactions in the last 15-minutes. A search process 610 accepts a search key from register 606 and reports any matches in the most 15-minute window with an account activity velocity counter 612. Too much very recent activity can hint there is a fraudster at work, or it may be normal behavior. A trigger 614 is issued that can be fed to an additional attribute smart agent that is included with attributes smart agents 530 and 540 and the others in parallel. Exception from this new account activity velocity counter smart agent is input to smart agent risk algorithm 550 in FIG. 5.

Figure 7:
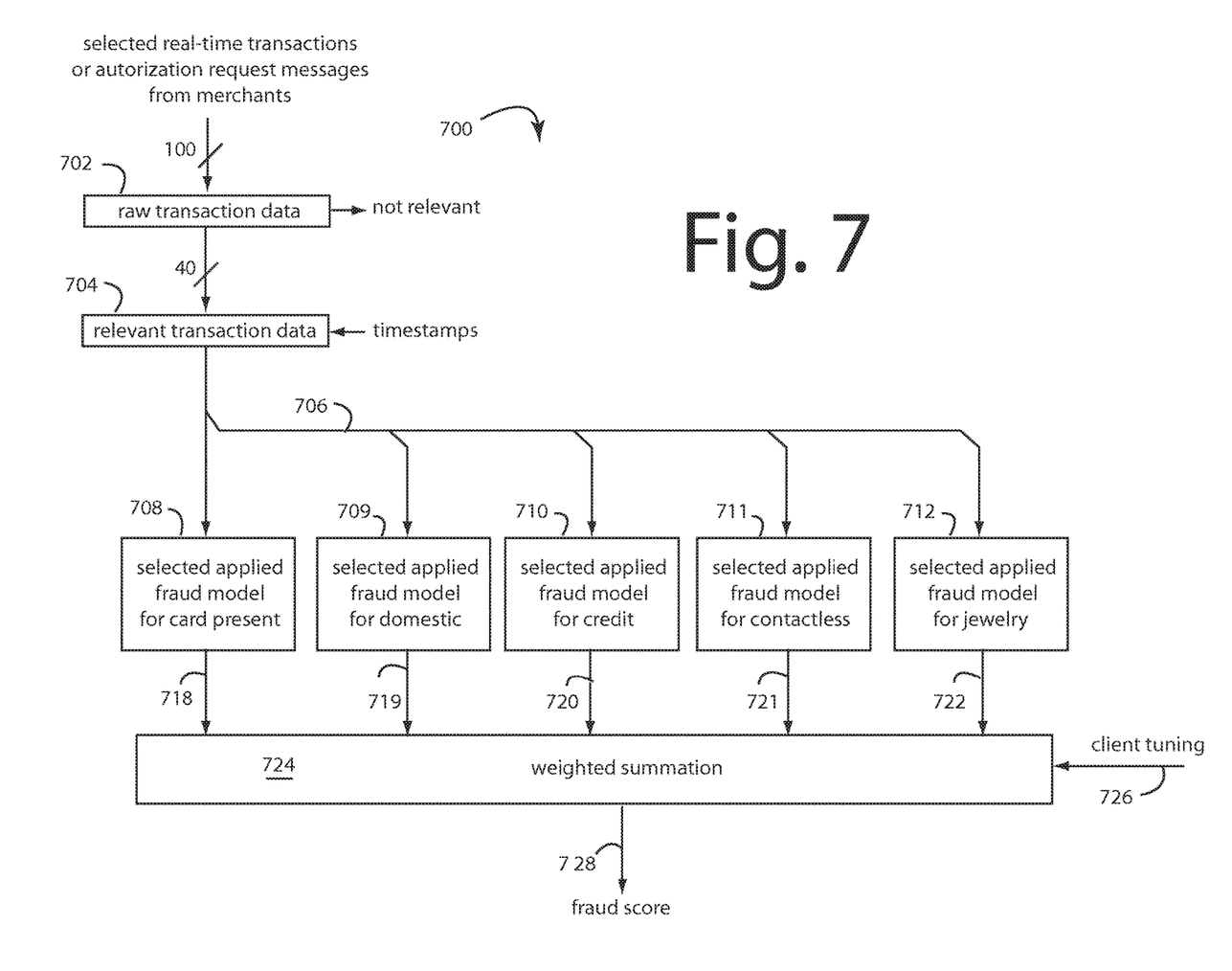
FIG. 7 is functional block diagram of a cross-channel payment fraud management embodiment of the present invention.

FIG. 7 represents a cross-channel payment fraud management embodiment of the present invention, and is referred to herein by general reference numeral 700.

Real-time multi-channel monitoring uses track cross channel and cross product patterns to cross pollinate information for more accurate decisions. Such track not only the channel where the fraud ends but also the initiating channel to deliver a holistic fraud monitoring. A standalone internet banking fraud solution will allow a transaction if it is within its limits, however if core banking is in picture, then it will stop this transaction, as we additionally know the source of funding of this account (which mostly in missing in internet banking).

In FIG. 3, a variety of selected applied fraud models 316-323 represent the applied fraud models 114 that result with different settings of filter switch 306. A real-time multi-channel monitoring payment network server can be constructed by running several of these selected applied fraud models 316-323 in parallel.

FIG. 7 represents a real-time multi-channel monitoring payment network server 700, in an embodiment of the present invention. Raw incoming transaction data is selectively filtered for relevancy by a process 702. The resulting relevant data is time-stamped in a process 704. A bus 706 feeds the same such data in parallel line-by-line, e.g., to a selected applied fraud model for card present 708, a selected applied fraud model for domestic 709, a selected applied fraud model for credit 710, a selected applied fraud model for contactless 711, and a selected applied fraud model for jewelry 712. In other words, this example array in FIG. 7 will very tightly analyze domestic contactless credit card transactions that are card-present in a jewelry purchase.

Each selected applied fraud model 708-712 provides exceptions 718-722 to the instant transactions on bus 706 that a weighted summation process 724 can balance according to a client tuning 726. A result 728 can be expected to be highly accurate with low false positives.

In general, embodiments of the present invention are adaptive. Adaptive learning combines three learning techniques. First is the automatic creation of profiles, or smart-agents, from historical data, e.g., long-term profiling. The second is real-time learning, e.g., enrichment of the smart-agents based on real-time activities. The third is adaptive learning carried by incremental learning algorithms.

For example, two years of historical credit card transactions data needed over twenty seven terabytes of database storage. A smart-agent is created for each individual card in that data in a first learning step, e.g., long-term profiling. Each profile is created from the card's activities and transactions that took place over the two year period. Each profile for each smart-agent comprises knowledge extracted field-by-field, such as merchant category code (MCC), time, amount for an mcc over a period of time, recursive profiling, zip codes, type of merchant, monthly aggregation, activity during the week, weekend, holidays, Card not present (CNP) versus card present (CP), domestic versus cross-border, etc. This profile will highlights all the normal activities of the smart-agent (specific card).

Smart-agent technology has been observed to outperform conventional artificial and machine learning technologies. For example, data mining technology creates a decision tree from historical data. When historical data is applied to data mining algorithms, the result is a decision tree. Decision tree logic can be used to detect fraud in credit card transactions. But, there are limits to data mining technology. The first is data mining can only learn from historical data and it generates decision tree logic that applies to all the cardholders as a group. The same logic is applied to all cardholders even though each merchant may have a unique activity pattern and each cardholder may have a unique spending pattern.

A second limitation is decision trees become immediately outdated. Fraud schemes continue to evolve, but the decision tree was fixed with examples that do not contain new fraud schemes. So stagnant non-adapting decision trees will fail to detect new types of fraud, and do not have the ability to respond to the highly volatile nature of fraud.

Another technology widely used is "business rules" which require expert to writes rules, e.g., if-then-else logic. The most important limitations are that business rules require writing rules that are supposed to work for whole categories of customers. This requires the population to be sliced into many categories (students, seniors, zip codes, etc.) and ask experts to think about rules that will be applied to all the cardholders of the category. How could the US population be sliced? Even worse, why would all the cardholders in a category all have the same behavior? It is obvious that business rules has limits, and poor detection rates with high false positives. What should also be obvious is the rules are outdated as soon as they are written because they don't adapt at all to new fraud schemes or data shifts.

Neural network technology also limits, it uses historical data to create a matrix weights for future data classification. The Neural network will use as input (first layer) the historical transactions and the classification for fraud or not as an output). Neural Networks only learn from past transactions and cannot detect any new fraud schemes (that arise daily) if the neural network was not re-trained with this type of fraud. Same as data mining and business rules the classification logic learned from the historical data will be applied to all the cardholders even though each merchant has a unique activity pattern and each cardholder has a unique spending pattern.

Another limit is the classification logic learned from historical data decision trees is outdated the same day of its use because the fraud schemes changes but since the neural network did learn with examples that contains this new type of fraud schemes, it will fail to detect this new type of fraud it lacks the ability to adapt to new fraud schemes and do not have the ability to respond to the highly volatile nature of fraud.

Contrary to previous technologies, smart-agent technology learns the specific behaviors of each cardholder and create a smart-agent that follow the behavior of each cardholder. Because it learns from each activity of a cardholder, the smart-agent updates the profiles and makes effective changes at runtime. It is the only technology with an ability to identify and stop, in real-time, previously unknown fraud schemes. It has the highest detection rate and lowest false positives because it separately follows and learns the behaviors of each cardholder.

Smart-agents have a further advantage in data size reduction. Once, say twenty-seven terabytes of historical data is transformed into smart-agents, only 200-gigabytes is needed to represent twenty-seven million distinct smart-agents corresponding to all the distinct cardholders.

Incremental learning technologies are embedded in the machine algorithms and smart-agent technology to continually re-train from any false positives and negatives that occur along the way. Each corrects itself to avoid repeating the same classification errors. Data mining logic incrementally changes the decision trees by creating a new link or updating the existing links and weights. Neural networks update the weight matrix, and case based reasoning logic updates generic cases or creates new ones. Smart-agents update their profiles by adjusting the normal/abnormal thresholds, or by creating exceptions.

Although particular embodiments of the present invention have been described and illustrated, such is not intended to limit the invention. Modifications and changes will no doubt become apparent to those skilled in the art, and it is intended that the invention only be limited by the scope of the appended claims.

I claim:

1. A computer-implemented method for detecting payment fraud, comprising:
    executing, at a computing device, an application including a classification model and a plurality of smart agents respectively corresponding to a plurality of transactional entities, each smart agent having a profile comprising a representation of historical data of the corresponding transactional entity and including long-term and real-time profiles with the real-time profile excluding historical data aged beyond a pre-determined time period, and the classification model being constructed according to one or more of: data mining logic, a neural network, case-based-reasoning, clustering, fuzzy logic, a genetic algorithm, a decision tree, and business rules;
    inputting, via the computing device, transactional data to the application, the transactional data including transaction records reflecting transactions of the plurality of transactional entities, the application being configured to perform the following steps for each of the transaction records
        compare the contents of at least one data field of the transaction record against each of the long-term profile and the real-time profile to generate a first output comprising an exception generated for each comparison result exceeding a corresponding threshold,
        process the contents of at least one data field of the transaction record via the classification model to generate a second output,
        analyze the first output and the second output using a weighted summation to generate a fraud score, including by adjusting the fraud score based on any generated exceptions,
    wherein the application is further configured to
        receive feedback to the fraud score comprising one of a false positive and a false negative indicator,
        re-train the classification model based on the feedback,
        update the long-term and real-time profiles based on the feedback,
        process future transaction records using the re-trained classification model and the updated long-term and real-time profiles.

2. The computer-implemented method of claim 1, wherein the classification model comprises data mining logic and the re-training comprises making an incremental change to a decision tree.

3. The computer-implemented method of claim 1, wherein the classification model comprises a neural network and the re-training comprises updating a weight matrix of the neural network.

4. The computer-implemented method of claim 1, wherein the application is further configured to update the profile of the corresponding smart agent to reflect contents of at least one data field of the transaction record.

5. The computer-implemented method of claim 1, wherein analyzing the first output and the second output using the weighted summation includes retrieving one or more client tuning inputs and incorporating the one or more client tuning inputs into the weighted summation.

6. The computer-implemented method of claim 1, wherein comparing the contents of the at least one data field of the transaction record against the real-time profile for each of the transaction records includes
    determining whether revising the real-time profile to reflect the transaction record exceeds a threshold for transactions associated with the corresponding transactional entity within the pre-determined time period.

7. The computer-implemented method of claim 1, wherein the profile of the corresponding smart agent includes a recursive profile.

8. The computer-implemented method of claim 7, wherein
    the application compares a plurality of data fields of the transaction record against the recursive profile,
    an exception is generated for each recursive comparison result exceeding a corresponding threshold,
    the weighted summation is configured to adjust the fraud score based on any generated recursive exceptions.

9. The computer-implemented method of claim 1, wherein
    the profile of the corresponding smart agent corresponds to a first transactional channel and to a first transactional entity of the plurality of transactional entities,
    the application is further configured to
        compare the contents of at least one data field of a second transaction record against a second profile corresponding to the first transactional entity and a second transactional channel to generate a third output, process the contents of at least one data field of the second transaction record via a second classification model to generate a fourth output, analyze the third output and the fourth output using one of the weighted summation and a second weighted summation to generate a second fraud score, adjust the profile in response to at least one of the third output, the fourth output and the second fraud score, adjust the second profile in response to at least one of the first output, the second output and the fraud score.

10. A computer program comprising instructions to perform the following steps, when executed by one or more processors:

compare contents of at least one data field of an instant transaction record against a corresponding profile of a smart agent, the profile including long-term and real-time profiles and comprising a representation of historical data of a corresponding transactional entity with the real-time profile excluding historical data aged beyond a pre-determined time period;

generate a first output from the comparison, the first output comprising an exception generated for each comparison result exceeding a corresponding threshold;

process contents of at least one data field of the instant transaction record via a classification model to generate a second output, the classification model being constructed according to one or more of: data mining logic, a neural network, case-based-reasoning, clustering, fuzzy logic, a genetic algorithm, a decision tree, and business rules;

analyse the first output and the second output using a weighted summation to generate a fraud score, including by adjusting the fraud score based on any generated exceptions;

receive feedback to the fraud score comprising one of a false positive and a false negative indicator;

re-train the classification model based on the feedback;

update the long-term and real-time profiles based on the feedback; and process future transaction records using the re-trained classification model and the updated long-term and real-time profiles.

11. The computer program of claim 10, wherein the classification model comprises data mining logic and the re-training comprises making an incremental change to a decision tree.

12. The computer program of claim 10, wherein the classification model comprises a neural network and the re-training comprises updating a weight matrix of the neural network.

13. The computer program of claim 10, wherein the program is further configured with instructions to update the profile of the corresponding smart agent to reflect contents of at least one data field of the transaction record.

14. The computer program of claim 10, wherein analyzing the first output and the second output using the weighted summation includes retrieving one or more client tuning inputs and incorporating the one or more client tuning inputs into the weighted summation.

15. The computer program of claim 10, wherein comparing the contents of the at least one data field of the transaction record against the real-time profile for each of the transaction records includes determining whether revising the real-time profile to reflect the transaction record exceeds a threshold for transactions associated with the corresponding transactional entity within the pre-determined time period.

16. The computer program of claim 10, wherein the profile of the corresponding smart agent includes a recursive profile.

17. The computer program of claim 16, wherein the program compares a plurality of data fields of the transaction record against the recursive profile, an exception is generated for each recursive comparison result exceeding a corresponding threshold, the weighted summation is configured to adjust the fraud score based on any generated exceptions.

18. The computer program of claim 10, wherein the profile of the corresponding smart agent corresponds to a first transactional channel and to the transactional entity, the program is further configured with instructions to compare the contents of at least one data field of a second transaction record against a second profile corresponding to the transactional entity and a second transactional channel to generate a third output, process the contents of at least one data field of the second transaction record via a second classification model to generate a fourth output, analyze the third output and the fourth output using one of the weighted summation and a second weighted summation to generate a second fraud score, adjust the profile in response to at least one of the third output, the fourth output and the second fraud score, adjust the second profile in response to at least one of the first output, the second output and the fraud score.

* * * * *